Sept. 5, 1944. O. D. LUTES 2,357,528
FARMING IMPLEMENT
Filed April 18, 1942

Inventor
Oakley D. Lutes
BY
Alois W. Graf
Atty.

Patented Sept. 5, 1944

2,357,528

UNITED STATES PATENT OFFICE 2,357,528

FARMING IMPLEMENT

Oakley D. Lutes, Jackson, Mich.

Application April 18, 1942, Serial No. 439,503

6 Claims. (Cl. 97—210)

My invention relates to farming implements, and more particularly to a plow colter assembly for cutting stalks, forage crops, and other debris so that they may be completely plowed under.

It is now necessary, that as nearly as possible, all corn stalks and debris be completely covered under when plowing, since the area affected by the European corn borer continues to increase. Heretofore, various types of colters have been devised to facilitate covering over debris such as corn stalks, straw, weeds, green or brown crops to be plowed under and the like, but generally such devices have had a number of disadvantages. Some colters have a tendency to force or raise the plows out of the soil while others subject the plow and colter assembly to a strong side thrust as to make it necessary to realign the assembly after initial installation in order to keep the plow in alignment during operation. Still other arrangements are subject to clogging by trash and debris between the moldboard of the plow and the colter, or between the frame and the colter. Still others which have an auxiliary disc adjacent the furrow side of the colter or another scraping member are subject to ineffective operation because the debris wedges between this member and the colter. In accordance with my invention, I provide a plow colter assembly with a cleaning member which has a shape and structure such that there is no tendency to raise or force the plow out of the soil, but on the contrary, there is a definite downward thrust which keeps the plow colter and the plow at the proper operating elevation. The degree of this downward thrust created by the apparatus comprising my invention may be controlled by increasing or decreasing the curvature of the scraping and cleaning moldboard-like member. Furthermore, the entire assembly is mounted upon a high swung frame which permits trash and debris to move along without impediment and without becoming attached to or clogging up portions of the plow and colter assembly. It further has been found, that my improved form of plow colter assembly requires less power to move the unit forward through the soil than other forms of colters operating under the same conditions.

It is an object of my invention to provide an improved form of plow colter which is positive in operation and rotation.

Another object of my invention is to provide an improved form of plow colter which is provided with a moldboard-like member which assists in severing debris which is incompletely cut by the colter.

Still another object of my invention is to provide an improved form of plow colter having a novel shape for cooperation with a scraper and cleaner so that debris will not become wedged between the colter and the scraper.

Another object of my invention is to provide an improved plow colter assembly having a moldboard-like member to cut and sever debris, such as corn stalks and the like and to urge the severed debris toward the furrow so that it will be properly and completely plowed under by the rearwardly disposed plow.

Another object of my invention is to provide an improved colter assembly having a moldboard-like member which will urge debris toward the furrow and hold the debris down by lifting the top portion of the soil and depositing it on the debris.

A further object of my invention is to provide an improved colter with means for insuring rotation of and cutting by the colter so as to assist in producing a cleanly plowed field even though the unplowed field was littered with debris such as corn stalks, straw, weeds, green or brown crops to be plowed under, and the like.

A further object of my invention is to provide an improved colter with a cleaning member whereby the wear on the leading edge of the cleaning member is reduced appreciably, and eliminates any chance of debris clogging between it and the colter blade.

Still further objects and advantages of my invention will become more readily apparent by reference to the following description taken in connection with the accompanying drawing, wherein.

Figure 1:
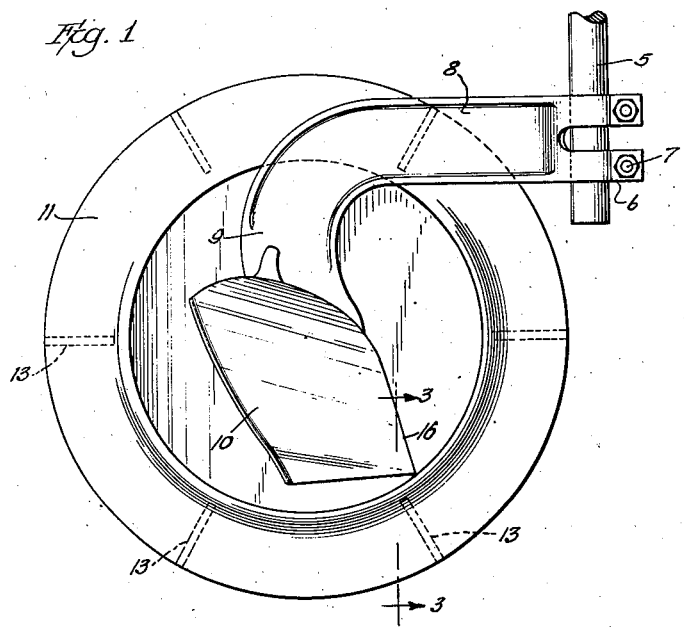
Figure 1 is a side view of the furrow side of my farming implement.
Figure 2:
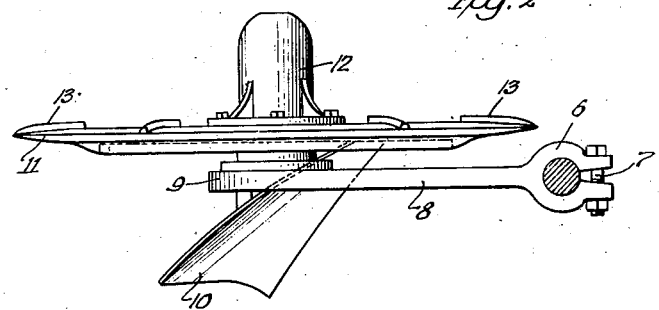
Figure 2 is a top view of the implement shown in Figure 1.
Figure 3:
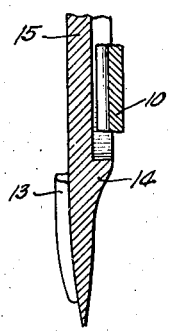
Figure 3 is a cross-section of a portion of the implement of Figure 1 along the line 3—3.

Referring to the drawing it will be seen that there is provided an implement for attachment to the plow beam of a plow which may be either of the disc or the plow share and moldboard type. Attached to the plow beam in an arm 5, the lower portion of which is shown in Figure 1, which may be in the form of a bell crank. To the lower portion of the arm 5 there is attached a colter assembly embodying my invention which includes an arm 6 secured thereto by suitable clamping means 7 comprising a bifurcated portion, and bolts and nuts. The arm 6 is provided with a relatively straight horizontal portion 8 terminating in a depending portion 9 which supports a moldboard-like cleaning and scraping member 10 and a rotary colter disc 11 either plain or notched types. By providing the arm 6 with a horizontal portion such as 8, the connections for the colter and the scraping member will be kept relatively free of tangling stalks and the like as there are no other suspended parts, such as the fork and axle ends of a conventional colter to catch and gather debris lying on top of the soil. The rotary colter disc 11 is provided with enclosed external bearing member 12 of a well known type which surrounds the axle portion of the arm 6 adjacent the depending portion 9. This bearing member 12 may be secured to the rotary plow colter 11 in any suitable manner as for example by means of bolts.

The colter 11 is generally positioned so that its circular cutting edge will be substantially in front of the plow sheath and in normal alignment therewith. In order that the colter 11 will be assured of positive operation and rotation there are provided at spaced intervals a plurality of radial protuberances 13 which when engaged by the soil will insure rotation of the colter. These radial protuberances 13 which preferably are of harder material than the remainder of the colter may be integrally formed with the colter disc by forging or may be secured thereto by a fabrication process such as welding. In certain soil where there is a tendency for the colter to remain stationary the spaced protuberances 13 will encounter additional resistance with the soil so as to produce rotation of the colter. By insuring positive continuous rotation of the colter 11 throughout the operation of the assembly, undue wear at one place on the rim is prevented, efficient cutting of the debris is assured and furthermore there is assured a continuous cleaning of the colter 11 by the moldboard-like scraping member 10.

The colter 11 is provided with an outer rim portion 14 which is of greater thickness than the body 15 of the plow colter so as to form a recess on the furrow side of the colter. This additional thickness of the rim of the plow colter in cooperation with the leading edge 16 of the moldboard-like cleaning member 10 prevents any stalks and any other debris from being wedged between the moldboard-like member 10 and the furrow face of the colter. The additional thickness of the rim 14 tends to urge debris away from the edge 16 of the scraping member 10 in a direction toward the furrow thereby reducing wear on the leading edge of the scraper. This obviates the tendency for this edge to wear so as to recede from the furrow side of the colter 11 which then would permit trash and debris to become wedged therebetween to impair efficient operation of the assembly.

In operation, the moldboard-like member 10 serves to scrape and maintain clean the recessed portion of the plow colter on the furrow side, and furthermore assists in the severing of any stalks or other debris which has been incompletely severed or cut by the cutting edge of the plow colter. The sharp edge of the colter imbeds stalks and debris in the soil so that the free ends thereof on the furrow side tend to remain above the soil, and thus the lower edge of the scraping member 10 comes in contact with this debris. This occurs because the member 10 has its lower edge sweeping rearwardly and in operation, it is just below the level of the soil whereby it severs the debris, with an action which is very much similar to when one holds a stick in one hand and with a slicing movement of a knife in the other hand slices or whittles off a section of the stick. The moldboard-like shape of the scraping and cleaning member 10 urges the debris toward the furrow and lifts the top portion of the soil to deposit it upon the debris to hold it down so that the following plow will effectively and completely furrow under all of the stalks and other debris. The moldboard-like member 10 may be provided with such curvatures and shape as to be best suited to meet the conditions of operation, and may be adjustably secured to the extremity 9 of the arm 6 so that the position and angle thereof will operate in the most effective manner in accordance with the type of and the condition of the ground which is to be plowed.

While the invention has been shown as being incorporated in a colter assembly having a flat disc colter, it is to be understood that the colter 11 might well be a curved or concave or convex colter in which case the leading edge 16 of the moldboard-like member will have a configuration complementary to the concave or convex colter disc. In either case the moldboard-like scraping and cleaning member is supported from the bracket 9 at an acute angle to the recessed face of the colter and ahead of the axis of the colter so that the leading edge of the moldboard-like member is adjacent to the colter rim and the recessed face.

What I claim as new and desire to secure by Letters Patent of the United States is:

1. An attachment for a plow comprising a rotary colter mounted upon a bracket adapted to be connected to a plow beam, said colter having an outer rim portion of a thickness sufficient to form a shallow recess on the furrow side of said colter, and a cleaning and spreading member supported from said bracket, and positioned with a leading edge portion thereof adjacent to and in back of said colter rim.

2. An implement for attachment ahead of a plow share comprising a bracket provided with means for attachment to the plow beam ahead of said plow share, a rotary colter mounted upon said bracket, said colter having a rim offset from the furrow side thereof to form a recessed face, and a cleaning and spreading member supported from said bracket at an angle to said recessed face ahead of the axis of rotation and rearwardly of the leading edge of said colter.

3. A farming implement comprising a bracket provided with means for attachment to a plow beam ahead of a plow share, a colter rotatably mounted on one end of said bracket, said colter having a body provided with a rim of greater thickness than the body of said colter to form a recessed face on the furrow side thereof, and a cleaning and spreading member supported from said bracket at an acute angle to said recessed face and ahead of the axis of rotation of said colter, said member having a moldboard-like shape with a leading edge adjacent said rim.

4. A farming implement comprising a bracket provided with means for attachment to a plow beam ahead of a plow share, a colter rotatably mounted at one end of said bracket, said colter having an outer rim portion offset from the furrow side to form a shallow recessed face on the furrow side, and a cleaning and spreading member supported from said bracket forward of the axis of rotation of said colter at an acute angle to said recessed face, said member having an edge conforming to the configuration of said recessed face, said edge being located adjacent said face with a leading portion thereof located immediately in back of said colter rim.

5. A farming implement comprising a rotatable colter supported from a plow beam ahead of a plow share, said colter having a body provided with a rim of greater thickness than the body of said colter to form a recessed face on the furrow side thereof, and a moldboard-like cleaning and spreading member supported adjacent the furrow side of said colter, said member having an inner edge conforming to the configuration of said recessed face, said edge being located adjacent said face with the leading portion thereof immediately in back of said colter rim, said member having a leading edge sweeping rearwardly toward the furrow and in operation being positioned just below the top of the soil.

6. A farming implement comprising a colter disc supported from a plow beam, said colter having a body provided with a rim of greater thickness than the body to form a recessed face on the furrow side thereof, and a moldboard-like cleaning member supported adjacent to the furrow side of said colter and having an edge conforming to said recessed face, said edge being adjacent said face with the leading portion of said edge immediately in back of the leading portion of said rim, said member having a surface of such curvature and shape as to create a downward thrust in operation to maintain the colter at the proper operating elevation and to position the forward edge of said member just below the top of the soil to assist in severing and moving debris toward the furrow.

OAKLEY D. LUTES.